United States Patent [19]
Schlund et al.

[11] Patent Number: 5,474,961
[45] Date of Patent: Dec. 12, 1995

[54] DEACTIVATED AND REACTIVATED METALLOCENE CATALYST SYSTEMS

[75] Inventors: Rueger Schlund, Mannheim; Meinolf Kersting, Bad Durkheim; Klaus-Dieter Hungenberg, Birkenau, all of Germany

[73] Assignee: BASF Aktiengesellschaft, Ludwigshafen, Germany

[21] Appl. No.: 204,273

[22] PCT Filed: Sep. 2, 1992

[86] PCT No.: PCT/EP92/02016

§ 371 Date: Mar. 8, 1994

§ 102(e) Date: Mar. 8, 1994

[87] PCT Pub. No.: WO93/05079

PCT Pub. Date: Mar. 18, 1993

[30] Foreign Application Priority Data

Sep. 12, 1991 [DE] Germany .................. 41 30 352.0

[51] Int. Cl.[6] .................. B01J 31/40; C08F 4/42
[52] U.S. Cl. .................. 502/103; 502/117; 502/120; 502/128; 526/90; 526/119
[58] Field of Search .................. 502/103, 117, 502/120, 128; 526/90, 119

[56] References Cited

U.S. PATENT DOCUMENTS

| 3,173,770 | 3/1965 | Thompson et al. | 44/63 |
| 3,202,491 | 8/1965 | Maxwell et al. | 44/63 |
| 4,871,375 | 10/1989 | Martischius et al. | 44/71 |
| 4,921,920 | 5/1990 | Collomb-Ceccarini et al. | 526/125 |
| 4,931,417 | 6/1990 | Miya et al. | 502/117 |
| 4,942,147 | 7/1990 | Karol et al. | 502/113 |
| 5,037,908 | 8/1991 | Tachikawa et al. | 526/97 |

FOREIGN PATENT DOCUMENTS

| 301448 | 7/1988 | European Pat. Off. . |
| 398101 | 5/1990 | European Pat. Off. . |

Primary Examiner—Asok Pal
Assistant Examiner—Timothy H. Meeks
Attorney, Agent, or Firm—Keil & Weinkauf

[57] ABSTRACT

Metallocene catalyst systems for the polymerization of $C_2$–$C_{10}$-alkenes are obtainable by deactivation of a preactivated metallocene catalyst system which contains, as active components, a metallocene complex of a metal of subgroup IV or V of the Periodic Table and an oligomeric alumoxane compound and, if required, subsequent reactivation.

6 Claims, No Drawings

DEACTIVATED AND REACTIVATED METALLOCENE CATALYST SYSTEMS

BACKGROUND OF THE INVENTION

The present invention relates to metallocene catalyst systems for the polymerization of $C_2$–$C_{10}$-alkenes, obtainable by deactivating a preactivated metallocene catalyst system which contains, as active components, a metallocene complex of a metal of subgroup IV or V of the Periodic Table and an oligomeric alumoxane compound.

The present invention furthermore relates to metallocene catalyst systems obtainable by reactivating the deactivated metallocene systems, processes for the preparation of the deactivated and reactivated metallocene catalyst systems, their use for the preparation of polyalkenes, processes for the preparation of polyalkenes with the aid of these metallocene catalyst systems and the polyalkenes obtainable.

Since metallocene catalysts obtain optimum polymerization activity when they are preactivated with aluminum compounds, process engineering problems, for example blockage of the metering system due to premature polymerization, may occur during metering of the catalysts. This problem can be avoided by deactivating such catalyst systems, although the deactivation must be reversible.

SUMMARY OF THE INVENTION

It is an object of the present invention to deactivate preactivated metallocene catalyst systems and then to reactivate them.

We have found that this object is achieved, according to the invention, by the metallocene catalyst systems defined at the outset. We have also found processes for the preparation of the deactivated and reactivated metallocene catalyst systems, their use for the preparation of polyalkenes, processes for the preparation of polyalkenes with the aid of these metallocene catalyst systems and the polyalkenes obtainable.

DESCRIPTION OF PREFERRED EMBODIMENTS

Metallocene catalyst systems which are suitable for deactivation contain, among the active components, a complex of a metal of subgroup IV or V of the Periodic Table, in particular of titanium, zirconium, hafnium, vanadium, niobium or tantalum. Preferably used complexes are those in which the metal atom is bonded to unsaturated cyclic carbon atoms via π bonds, for example cyclopentadienyl, fluorenyl or indenyl groups. Furthermore, in preferably used complexes, the metal atom may also be bonded to further ligands, in particular to fluorine, chlorine, bromine, iodine, hydrogen or $C_1$–$C_{10}$-alkyl, for example methyl, ethyl, propyl or butyl. Particularly suitable complexes contain, in particular, chlorine.

Merely by way of example, reference may be made here to EP-A 129 368, EP-A 407 870, EP-A 413 326, EP-A 399 347 and DE-A 39 29 693, in which suitable metallocene catalyst systems are described.

Metallocene catalyst systems which have proved to be preferable are those which contain, as active components, a) a metallocene complex of the formula I

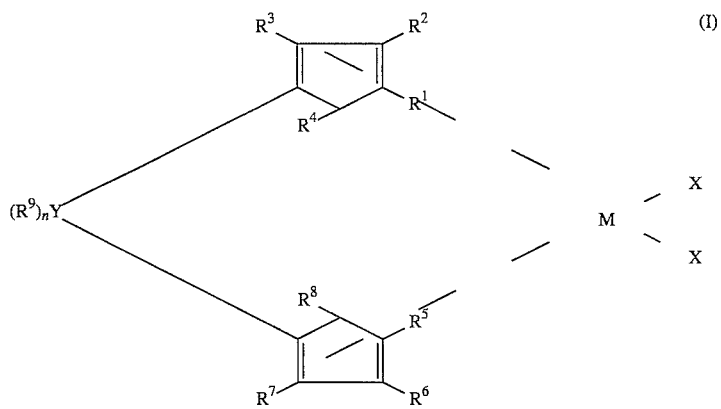

where $R^1$ to $R^3$ and $R^5$ to $R^7$ are each hydrogen, $C_1$–$C_{10}$-alkyl, 5-membered to 7-membered cycloalkyl which in turn may carry a $C_1$–$C_6$-alkyl radical as a substituent, or $C_6$–$C_{15}$-aryl or arylalkyl, where two adjacent radicals $R^1$ and $R^2$, $R^2$ and $R^3$, $R^5$ and $R^6$ or $R^6$ and $R^7$ together may be a cyclic group of 4 to 15 carbon atoms, $R^4$ and $R^8$ are each hydrogen or $C_1$–$C_{10}$-alkyl, $R^9$ is $C_1$–$C_{10}$-alkyl, $C_3$–$C_{10}$-cycloalkyl or $C_6$–$C_{10}$-aryl, M is titanium, zirconium, hafnium, vanadium, niobium or tantalum, Y is silicon, germanium, tin or carbon, X is hydrogen, fluorine, chlorine, bromine, iodine or $C_1$–$C_{10}$-alkyl and n is 0, 1 or 2, and b) an open-chain or cyclic alumoxane compound of the formula II or III

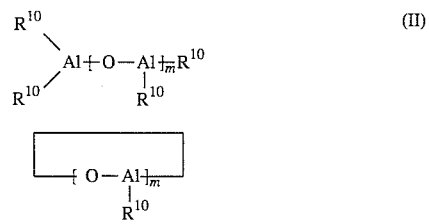

where $R^{10}$ is $C_1$–$C_4$-alkyl and m is from 5 to 30.

Preferred metallocene complexes of the general formula I are those in which $R^1$ and $R^5$ are identical and are each hydrogen or $C_1$–$C_{10}$-alkyl, $R^4$ and $R^8$ are identical and are each hydrogen, methyl, ethyl, isopropyl or tert-butyl, $R^3$ and $R^7$ are each $C_1$–$C_4$-alkyl, $R^2$ and $R^6$ are each hydrogen, or two adjacent radicals $R^2$ and $R^3$, and $R^6$ and $R^7$, together form unsaturated cyclic groups of 4 to 12 carbon atoms, $R^9$ is $C_1$–$C_8$-alkyl, M is zirconium or hafnium, Y is silicon or carbon and X is chlorine.

Examples of particularly suitable complexes include
dimethylsilanediylbis-(3-tert-butyl-5-methylcyclopentadienyl)-zirconium dichloride,
diethylsilanediylbis-(3-tert-butyl-5-methylcyclopentadienyl)-zirconium dichloride,
methylethylsilanediylbis-(3-tert-butyl-5-methylcyclopentadienyl)-zirconium dichloride,
dimethylsilanediylbis-(3-tert-butyl-5-ethylcyclopentadienyl)-zirconium dichloride,
dimethylsilanediylbis-(3-tert-butyl-5-methylcyclopentadienyl)-dimethylzirconium,
dimethylsilanediylbis-(2-methylindenyl)-zirconium dichloride,
diethylsilanediylbis-(2-methylindenyl)-zirconium dichloride,
dimethylsilanediylbis-(2-ethylindenyl)-zirconium dichloride,
dimethylsilanediylbis-(2-isopropylindenyl)-zirconium dichloride,
dimethylsilanediylbis-(2-tert-butylindenyl)-zirconium dichloride,
diethylsilanediylbis-(2-methylindenyl)-zirconium dibromide,
dimethylsulfidebis-(2-methylindenyl)-zirconium dichloride,
dimethylsilanediylbis-(2-methyl-5-methylcyclopentadienyl)-zirconium dichloride,
dimethylsilanediylbis-(2-methyl-5-ethylcyclopentadienyl)-zirconium dichloride,
dimethylsilanediylbis-(2-ethyl-5-isopropylcyclopentadienyl)-zirconium dichloride,
dimethylsilanediylbis-(2-methylindenyl)-zirconium dichloride,
dimethylsilanediylbis-(2-methylbenzindenyl)-zirconium dichloride and
dimethylsilanediylbis-(2-methylindenyl)hafnium dichloride.

Such complexes can be synthesized by conventional methods, the reaction of the correspondingly substituted, cyclic hydrocarbon anions with halides of titanium, zirconium, hafnium, vanadium, niobium or tantalum being preferred. Examples of corresponding preparation processes are described in, inter alia, J. Organometal. Chem. 369 (1989), 359–370.

In addition to the complex, the metallocene catalyst systems also contain oligomeric alumoxane compounds of the general formula II or III, where $R^{10}$ is preferably methyl or ethyl and m is preferably from 10 to 25.

These oligomeric alumoxane compounds are usually prepared by reacting a solution of a trialkylaluminum with water, a preparation described in, inter alia, EP-A 284 708 and U.S. Pat. No. 4,794,096.

As a rule, the oligomeric alumoxane compounds obtained are present as mixtures of both linear and cyclic chain molecules of different lengths, so that m is to be regarded as an average value. The alumoxane compounds may furthermore contain trialkylaluminum compounds whose alkyl groups are each of 1 to 8 carbon atoms, for example trimethyl-, triethyl- or methyldiethylaluminum, or trialkylaluminum compounds in which some of the organic radicals have been replaced with hydrogen atoms.

It has proven advantageous to use the complexes of a metal of subgroup IV or V of the Periodic Table and the oligomeric alumoxane compound in amounts such that the ratio of aluminum from the oligomeric alumoxane compound to the transition metal from said complex is from 10:1 to $10^6$:1, in particular from 10:1 to $10^4$:1.

First, the complex of the metal of subgroup IV or V of the Periodic Table is mixed with the oligomeric alumoxane compound, with the result that an activated catalyst system is obtained. The duration of this activation step is usually from 1 to 120, preferably from 10 to 100, minutes. Mixing is preferably carried out by bringing the complex into contact with a solution of the oligomeric alumoxane compound in an inert solvent, for example in benzene, toluene, hexane, heptane or a mixture thereof, at from 0° to 50° C.

Electrophilic reagents have proven particularly suitable for deactivating these preactivated metallocene catalyst systems. Organic halides, such as alkyl halides of 1 to 10 carbon atoms and aryl halides of 6 to 12 carbon atoms which in turn may be monosubstituted to pentasubstituted by $C_1$–$C_{10}$-alkyl or halogen, in particular benzyl chloride, alcohols of 1 to 10 carbon atoms, ketones of 3 to 12 carbon atoms, aldehydes of 2 to 10 carbon atoms and NO, $CO_2$ or mixtures of the stated compounds are preferred. Benzyl chloride and $CO_2$ have proven particularly preferable.

The compounds used for the deactivation are used as a rule in amounts of from 0.1 to 5,000, preferably from 1 to 500, in particular from 1 to 200, based on mole equivalents of transition metal.

The temperatures and pressures at which the deactivation of the preactivated metallocene catalyst systems is effected are in principle not critical. As a rule, temperatures of from −70° to +100° C. and pressures of from 0.1 to 3,000 bar are employed. The deactivation is usually carried out over a period of from 0.1 to 100 minutes.

The deactivated metallocene catalyst systems can then be metered into the reactor and thereafter reactivated in the reactor.

Organometallic compounds have proven particularly suitable for reactivating these deactivated metallocene catalyst systems. Aluminum organyls, preferably alumoxanes, are preferred.

Particular examples are open-chain or cyclic alumoxane compounds of the formula II or III, respectively.

The oligomeric alumoxane compounds are usually dissolved in an inert solvent such as benzene, toluene, hexane or heptane, or a mixture thereof and added to the deactivated metallocene catalyst systems. Here too, the temperatures, pressures and times for the reactions are in principle not critical; usually the reaction is carried out at from −70° to +100° C. and from 0.1 to 3,000 bar over a period of from 0.1 to 100 minutes.

The compounds used for the reactivation are as a rule employed in amounts of from 10 to $10^5$, preferably from $10^2$ to $10^4$, in particular from $10^2$ to $10^3$, based on mole equivalents of transition metal.

The metallocene catalyst systems reactivated in this manner can be used for the preparation of polyalkenes.

These are understood as meaning homo- and copolymers of $C_2$–$C_{10}$-alkenes, ethylene, propylene, butenes, pentenes and hexenes being preferably used as monomers. The novel catalyst systems are preferably suitable for the preparation of polypropylene and of copolymers of propylene with minor amounts of other $C_2$–$C_{10}$-alkenes, in particular of ethylene and butenes.

The preparation of these polymers can be carried out either batchwise or, preferably, continuously, in the conventional reactors used for the polymerization of alkenes. Suitable reactors include continuously operated stirred kettles, and a plurality of stirred kettles connected in series may also be used.

The polymerization is carried out at from 1 to 3,000 bar, preferably from 1 to 2,500 bar, and from 0° to 300° C. preferably from 0° to +150° C. The polymerization time is usually from 0.5 to 10 hours.

Polymerization reactions with the aid of the novel catalyst system can be carried out in the gas phase, in a suspension, in liquid monomers and in inert solvents. In the polymerization in solvents, liquid hydrocarbons, such as benzene or toluene, are used in particular. Polymers having good performance characteristics are also obtainable in the polymerization in the gas phase, in a suspension and in liquid monomers.

The average molecular weight of the polymers formed can be controlled by the methods usually employed in polymerization technology, for example by feeding in regulators, such as hydrogen, or by changing the reaction temperatures.

The resulting polymers of $C_2$–$C_{10}$-alkene can be used in particular for the production of fibers, films and moldings.

The novel deactivated and reactivated metallocene catalyst systems are very easy to handle and have good productivity.

EXAMPLES

Preparation of Propylene Polymers

EXAMPLE 1 a) Preparation of a Preactivated Metallocene Catalyst System 9 mg (a 0.02 mmol) of dimethylsilanediylbis-(1-indenyl)-zirconium dichloride

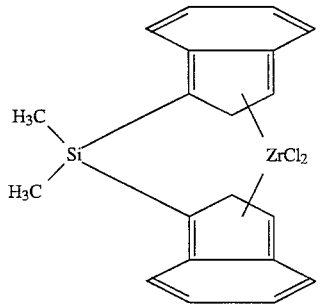

were dissolved in 5 ml of 1.6 molar methylalumoxane/toluene solution and stirred for 15 minutes at room temperature (molar ratio Al:Zr=400:1).

b) Deactivation of the Preactivated Metallocene Catalyst System

A 0.1 molar solution of benzyl chloride in toluene ($\hat{=}$3 mmol of benzyl chloride) were added at room temperature to the preactivated metallocene catalyst system prepared according to a), and the mixture was stirred for 10 minutes.

The metallocene catalyst system deactivated according to b) was then introduced into a stirred container having an effective volume of 1 l.

c) Reactivation of the Deactivated Metallocene Catalyst System 10 ml of 1.6 molar methylalumoxane/toluene solution ($\hat{=}$16 mmol of methylalumoxane) were then added, in the reactor, to the metallocene catalyst system deactivated according to b), and the mixture was stirred for 5 minutes at room temperature.

d) Polymerization 150 ml of toluene were added to the metallocene catalyst system reactivated according to c), and propylene was then passed in at 50° C. and 1 bar for 30 minutes. Thereafter, the reaction product was stirred into 850 ml of a mixture of methanol and hydrochloric acid (molar ratio 16:1) and the precipitate was filtered off and dried for 4 hours at 90° C.

Productivity [g of polypropylene/g of Zr compound]: 2023

EXAMPLE 2

The procedure in Example 1 was followed, except that the deactivation (step b)) was carried out with 78 ml of $CO_2$ ($\hat{=}$3.5 mmol), which was passed into the preactivated metallocene catalyst solution at room temperature via a rotameter.

Productivity [g of polypropylene/g of Zr compound]: 223

COMPARATIVE EXAMPLES V1 AND V2

The procedure in Examples 1 and 2 was followed, but without reactivation of the deactivated metallocene catalyst systems (stage c)).

These catalyst systems were no longer active in the polymerization, ie. the productivity [g of polypropylene/g of Zr compound] was zero both in Comparative Example 1 and Comparative Example 2.

We claim:

1. A metallocene catalyst system for the polymerization of $C_2$–C10-alkenes, obtained by reversibly deactivating a metallocene catalyst system which contains, as active components, a metallocene complex of a metal of subgroup IV or V of the Periodic Table and an oligomeric alumoxane compound by mixing with an organic halide and reactivating the obtained deactivated catalyst system by admixing with an organometallic compound.

2. A metallocene catalyst system as defined in claim 1, wherein methylalumoxane is used for the reactivation.

3. A process for the preparation of a metallocene catalyst system as defined in claim 1, wherein a metallocene catalyst system is reversibly deactivated by mixing with an organic halide, and thereafter reactivated by the addition of an organometallic compound.

4. A process for the preparation of a polymer of $C_2$–$C_{10}$-alkenes which comprises: polymerizing the $C_2$–$C_{10}$-alkenes in the presence of the metallocene catalyst system defined in claim 1.

5. A metallocene catalyst system as defined in claim 1, wherein a metallocene catalyst system is deactivated by mixing with benzyl chloride.

6. A process for the preparation of a metallocene catalyst system as defined in claim 1, wherein a metallocene catalyst system is reversibly deactivated by mixing with benzyl chloride.

* * * * *

UNITED STATES PATENT AND TRADEMARK OFFICE
CERTIFICATE OF CORRECTION

PATENT NO. : 5,474,961

DATED : December 12, 1995

INVENTOR(S) : SCHLUND et al.

It is certified that error appears in the above-indentified patent and that said Letters Patent is hereby corrected as shown below:

Column 6, claim 1, line 2, "$C_2$-C10-alkenes" should read --$C_2$-$C_{10}$-alkenes--.

Signed and Sealed this

Fifth Day of March, 1996

Attest:

BRUCE LEHMAN

*Attesting Officer*   *Commissioner of Patents and Trademarks*